United States Patent [19]

Nodfelt

[11] Patent Number: 5,257,333
[45] Date of Patent: Oct. 26, 1993

[54] CONNECTING DEVICE FOR INTERCONNECTION OF OPTICAL FIBRES

[76] Inventor: Anders Nodfelt, Lingonstigen 7, S-578 00 Aneby, Sweden

[21] Appl. No.: 847,094
[22] PCT Filed: Oct. 10, 1990
[86] PCT No.: PCT/SE90/00651
§ 371 Date: May 26, 1992
§ 102(e) Date: May 26, 1992
[87] PCT Pub. No.: WO91/06023
PCT Pub. Date: May 2, 1991

[30] Foreign Application Priority Data

Oct. 13, 1989 [SE] Sweden ............................. 8903366

[51] Int. Cl.⁵ ........................... G02B 6/26; G02B 6/38
[52] U.S. Cl. .......................................... 385/64; 385/55; 385/56; 385/66; 385/81; 385/82; 385/84
[58] Field of Search .................... 385/55, 56, 58, 62, 385/66, 70, 71, 64, 81–82, 84

[56] References Cited

U.S. PATENT DOCUMENTS

| | | | |
|---|---|---|---|
| 4,099,832 | 7/1978 | Warner, Jr. | 385/82 X |
| 4,132,461 | 1/1979 | Jacques et al. | 385/82 X |
| 4,208,092 | 6/1980 | Monaghan et al. | 385/66 X |
| 4,370,022 | 1/1983 | Johnson | 395/64 X |
| 4,406,515 | 9/1983 | Roberts | 385/62 X |
| 4,448,482 | 5/1984 | Lathlaen | 385/64 X |
| 4,469,400 | 9/1984 | Hakoun | 385/64 X |
| 4,473,272 | 9/1984 | Johnson | 385/64 X |
| 4,483,584 | 11/1984 | Gresty | 385/64 X |
| 4,486,072 | 12/1984 | Roberts | 385/64 X |
| 5,119,456 | 6/1992 | Kawanami et al. | 385/82 |

FOREIGN PATENT DOCUMENTS

| | | | |
|---|---|---|---|
| 0157501 | 10/1985 | European Pat. Off. | 385/64 X |
| 2757215 | 7/1981 | Fed. Rep. of Germany | 385/64 X |
| 2119948 | 11/1983 | United Kingdom | 385/64 X |

OTHER PUBLICATIONS

Harper et al., "Fiber-Optic Connector" I.B.M. tech. discl. bull. vol. 21, No. 5 Oct. 1978.

Primary Examiner—Brian Healy
Attorney, Agent, or Firm—D. Peter Hochberg; Mark Kusner; Michael Jaffe

[57] ABSTRACT

Connection device for connecting the end portions of optical fibres (30) comprising insertion means (12) and receiving means (11) designed for cooperation with at least a centering means (37) for radial and axial centering of the end portions of the optical fibres relative to each other. The centering means (37) is comprised of a sleeve (38) being closed in cross-section and provided with internal guiding elements (39) in the form of centering shanks extending in the longitudinal direction, and external guiding elements (40) in the form of ridge formed portions (40) extending in the longitudinal direction of the sleeve connected to the centering shanks and designed to allow the centering shanks to radially spring in a direction toward and from the center axis of the sleeve.

8 Claims, 5 Drawing Sheets

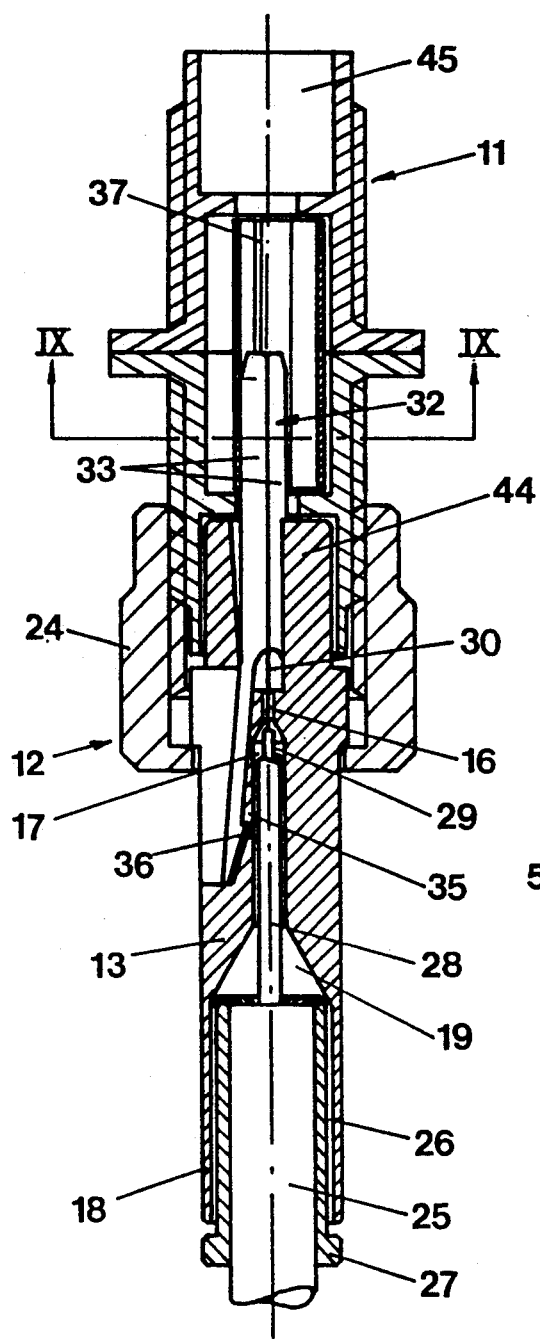
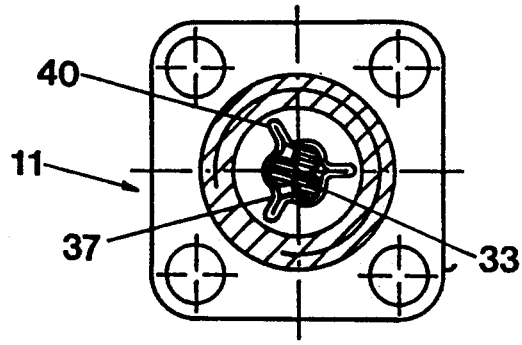
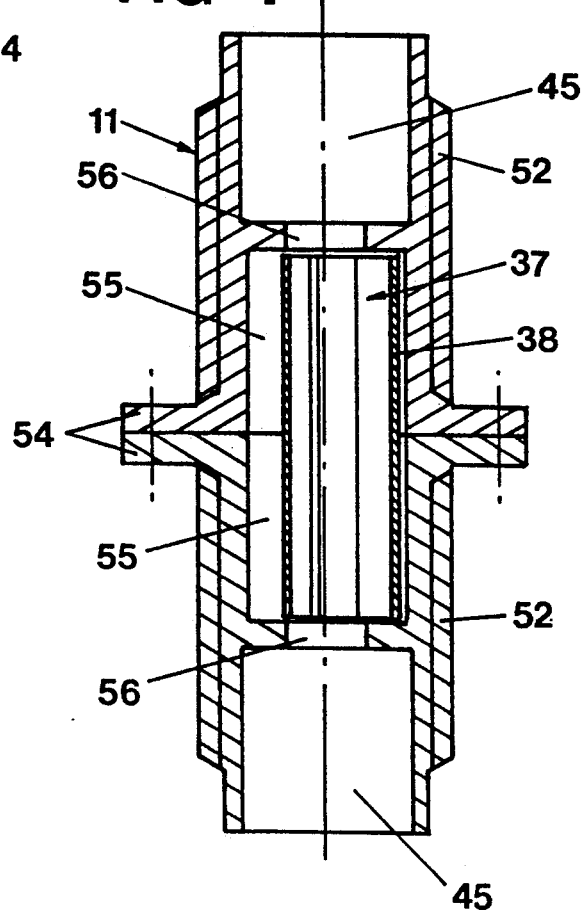

CONNECTING DEVICE FOR INTERCONNECTION OF OPTICAL FIBRES

The present invention refers to a connection device for connecting the end portions of axially opposite to each other situated optical fibres and comprising insertion and receiving means designed for cooperation with at least a centering means for radial and axial centering of the end portions of the optical fibres relatively each other.

BACKGROUND OF THE INVENTION

In the last few years connection devices have been developed to connect optical fibres with each other, so that the fiber ends are situated exactly axially opposite to each other. An example on such a connection device is shown in the swedish patent 426 882. A difficulty with connection of optical fibres at the ends to each other is their small diameter, which amounts to one or a few tenths of a millimeter, while the optical core thereof can have a diameter of 10-50 um. An eccentricity of the end portions of the fibre cables of one or a few thousand parts of a millimeter thus constitutes a rough deviation, whereby the losses increase drastically. Very high demands are thus put on the tolerances of the connection device, which leads to complicated constructions and high manufacturing costs.

Connection devices are previously known (IBM Technical Disclosure Bulletin, volume 21 on Oct. 5, 1978) for connection of optical fibres, where the fibre is guided and fixed by three axial rods arranged in a conical guiding body, which is radially slotted. The guiding body is insertable in a receiving means with corresponding conicity, whereby the guiding body by means of a cap nut can be pressed into the receiving means. Since the conical part of the guiding body in its rear part passes over into a solid annular shaped member, a bringing together of the guiding body in the receiving means only the front part of the conical part will be compressed, which means that the fibre only is guided and fixed in its front end. If the tightening pressure is increased to get a larger part of the fibre fixed inside the guiding body the pressure stress at the extreme ends of the guiding body will become so large that the fibre will be crushed.

Through DE-B2-27 57 215 is known a connection device where a number of rods are surrounded by a slotted circlip, the function of which is to keep the rods together and thereby form a receiving means, in which from both ends is insertable a connection pin. If the fibre diameter in one of the connection pins is larger or smaller than the fibre diameter in the other connection pin, only one of the connection pins will be fixed in the receiving means, while the other will take an eccentric position relatively the first connection pin.

OBJECT OF THE INVENTION AND MOST ESSENTIAL FEATURES

The object of the present invention is to accomplish a connection device for optical fibres of the above mentioned type, with which is provided:

a) a reliable and very exact centering of the fibre end portions with very simple means;

b) a possibility to connect optical fibres of different thickness with the end portions situated opposite to each other in exact coaxial positions;

c) a security that the optical fibre will not be deformed at the connection with the connection device;

d) a connection of the optical fibre with the insertion means and this with the receiving means without using special tools and glued joints or casted joints.

This task has been solved by the centering means being constituted by a sleeve being closed in cross section provided with internal guiding elements in the form of centering shanks extending in the longitudinal direction and external guiding elements in the form of ridge formed portions likewise extending in the longitudinal direction of the sleeve connected to the centering shanks and designed to allow the centering shanks to radially resiliate in a direction towards and from the centre axis of the sleeve.

DESCRIPTION OF THE DRAWINGS

The invention will be described in greater detail in some embodiments with reference to accompanying drawings.

FIG. 7 shows a section through a receiving means contained in the connection device according to the invention.

FIG. 8 shows a section of a connection device assembled from an insertion device and a receiving device.

FIG. 9 shows a section along the line IX—IX in FIG. 8.

DESCRIPTION OF EMBODIMENTS

A connection device according to the invention for connection of the end portions of two optical fibres may consist of a receiving means 11 and two insertion means 12, of which the last mentioned are axially arranged one optical fibre each and which insertion means are connectable with the receiving means 11.

Figure 1:
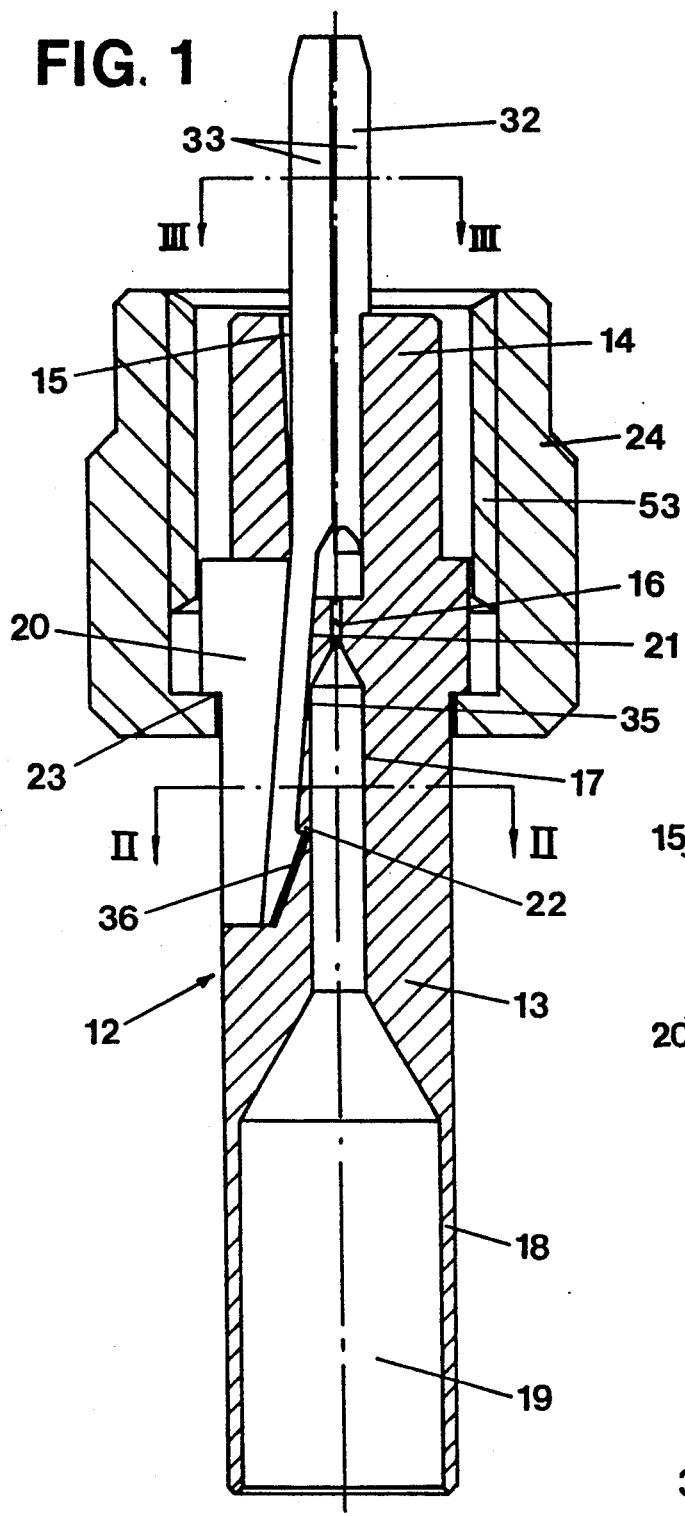
FIG. 1 shows a section through an insertion means contained in a connection device according to the invention.
Figure 3:
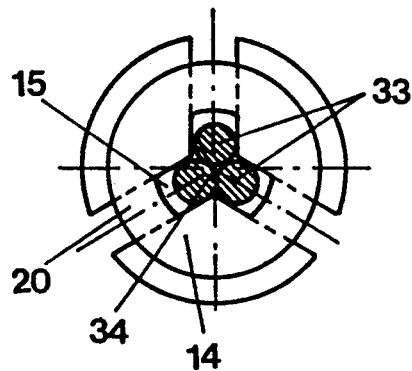
FIG. 3 is a section along the line III—III in FIG. 1.
Figure 2:
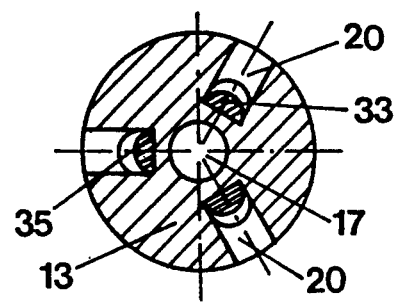
FIG. 2 is a section along the line II—II in FIG. 1.

The insertion means 12—shown in FIG. 1—comprises a plug 13, which in its front end portion 14 is provided with an axial channel 15, which in section is Y-formed. The channel 15 passes over to a concentric with relation to this provided central through bore, which consists of a first section 16 with a small diameter, a second section with a somewhat larger diameter and a section 19 with considerably larger diameter situated in the rear end portion 18 of the insertion means.

The channel 15 which is Y-formed in section, passes over in radial slots 20, situated in the extensions of the Y-formed channel members. The bottom 21 of the slots 20 is conical, that is slants like a ramp from the channel members and upwards, with its largest depth closest to the channel 15. At the bottom 21 is provided a hookshaped recess 22. The plug 13 is further formed with a shoulder 23, which forms a stop face for a cap nut 24.

As can be seen from FIG. 8 the bore is intended to receive an optical fibre cable 25 the stress-relieving membrane 26 of which has been exposed and turned over the cable, which is clamped by means of a clamping sleeve 27. In the middle bore 17 is placed the secondary protection 28 which is released from the cable cover and up to the smallest bore 16 the primary protection 29 extends. The totally exposed optical fibre 30 has been thread through the bore 16, which fibre is centered and fixed by the connecting pin 32 of the insertion means, which connecting pin in the shown embodiment consists of three cylindrical rods 33 with circular cross section, placed into contact with each other, so that these between each other form a central slot or channel 34 for receiving the optical fibre 30. About a third of the rods are situated outside the plug 13, the middle third is situated in the Y-formed channel 15, while the rear third of the rods is shaped with a smoothed down portion 35, which is intended during the mounting to slide along the conical bottom 21 of the slots 20. In the smoothed down portion 35 is also provided a lip 36, which cooperates with the hook-formed recess 22 at the bottom 21 of the slot 20. The conicity of the bottom of the slot is chosen such, that the rods 32 at their insertion in the plug through the Y-formed channel 15, will spring outwards and act like cantilevers, where the rear end of the rods provided with the smoothed down portion 35 forms one of the cantilevers and the cylindrical part of the rods the other cantilever. The conical bottom 21 of the slots 20 thus on the part of the rods between which the optical fibre 30 is placed exerts a radial inwards directed force towards each other, which effectively guides and fixes the optical fibre between the rods. The part of the fibre 30 projecting outside the rods is cut off and the surface of the section is polished.

The mounting of the fibre cable in the insertion means 12 is carried out by peeling off the primary and secondary protection from the cable. When the optical fibre 30 has been exposed, it is thread through the bore 16 and is placed in the slot or channel 34 which is formed between the rods 33. The fibre 30 is fixed in the channel 34 by the smoothed down portion 35 with the lip 36 of the rod 22 being snapped in behind the lips 22. The cover of the cable is clamped in the bore 19 by means of the clamping sleeve 27. Thereby has been achieved a simple insertion means, the optical fibres of which are exactly, centrally and coaxially oriented relatively the rods 33. The object is now to center two such insertion means relatively each other in such a way, that the connection pins come into exact positions relatively each other and where the tolerances are so small that the accuracy stated by way of introduction is fulfilled. This task has been solved by means of a centering means 37, consisting of a sleeve 38, which is provided with internal guiding elements 30 in the form of radially resilient centering shanks, whereby the resiliency of these shanks is accomplished by means with these connected external guiding elements 40 eg. in the form of axial edge foldings, ridges or the like of which the bent edge 41 forms the external contact surface of the centering means, such as is shown in FIG. 9. The free space between the centering shanks 39 is somewhat less than the external limitation of the connection pin 32, so that when this is inserted in said sleeve 38, the centering shanks are pressed slightly radially apart. In order to restrict this expansion only to the portion of the sleeve where the connection pin is inserted, the sleeve 37 may be provided with circumferential slots 42 (FIGS. 4 and 5).

Figure 4:
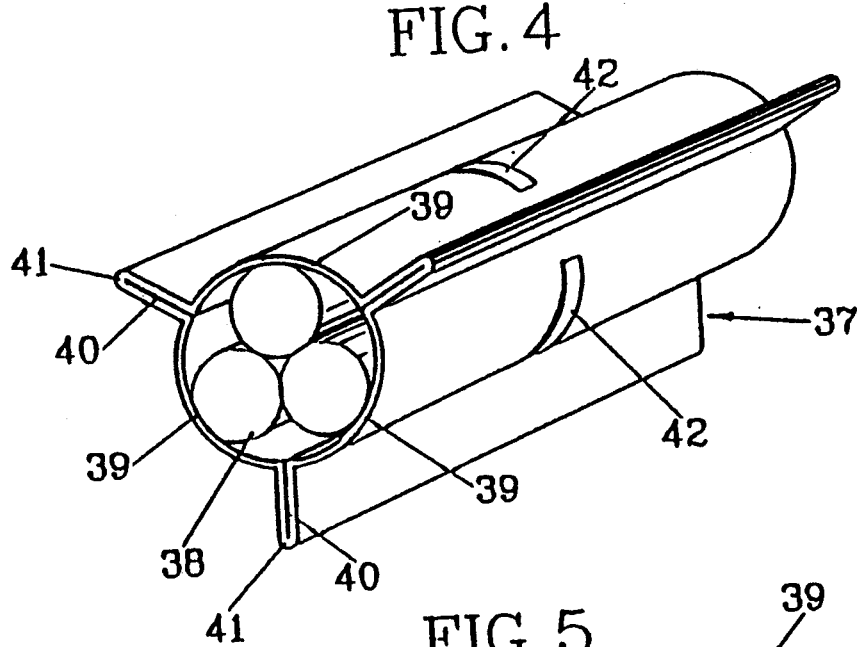
FIGS. 4, 5, and 6 show in perspective three alternative embodiments of centering means.
Figure 5:
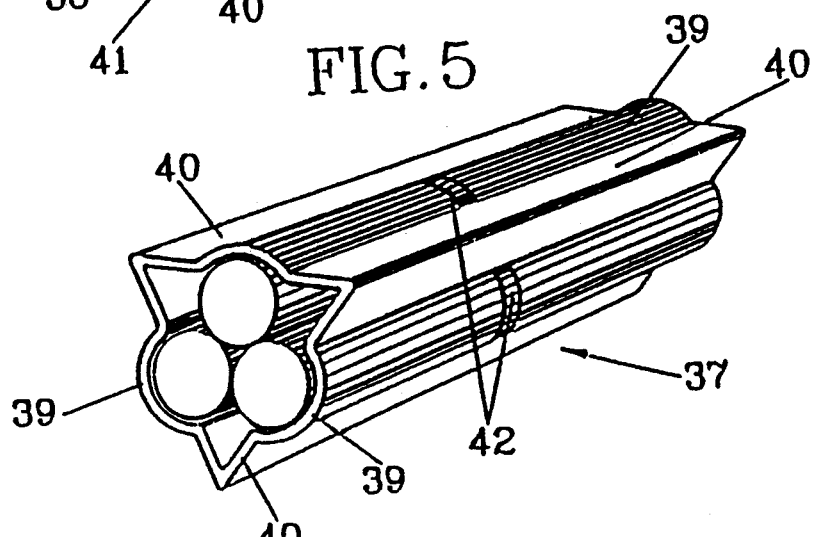
Figure 6:
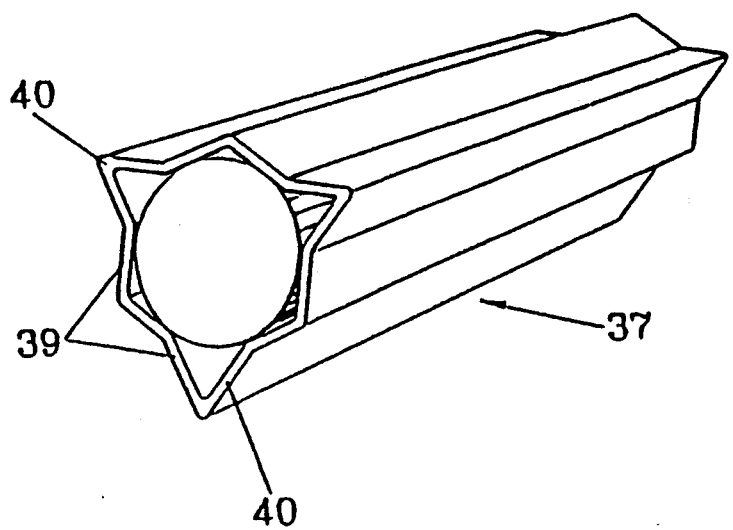

The sleeve can be given various forms and be adapted to connecting pins of different form and dimension and also to the number rods 33 contained in the connection pin 32, as is shown in FIGS. 4, 5 and 6.

The receiving means 11 shown in FIGS. 7-9 is on the outside provided with threads 52 fitting to the threads 53 on the sleeve nut 24 of the insertion means 12. Thus two insertion means 12 which are insertable into the ends of the receiving means thus by means of the sleeve nuts 24 may be fixed to the receiving means, whereby the guiding of the front end portion 44 of the insertion means is carried out by cooperation between this and a corresponding recess 45 in the front respectively the rear end of the receiving means 11. The receiving means contains two members and each member at one end is provided with a flange 54 which flanges in the assemblied state of the receiving means are situated opposite each other. At the end of each member provided with a flange 54 is provided a central recess 55 coaxially arranged with the recesses 45 and a bore 56 interconnecting these recesses. In the recess 55 is placed the centering means 37, whereby the inner diameter of the cylindric recess 55 corresponds to the outer diameter of the centering means. The length of the recess 55 mainly corresponds to the length 37 of the centering means, so that this is fixed to its position.

Figure 10:
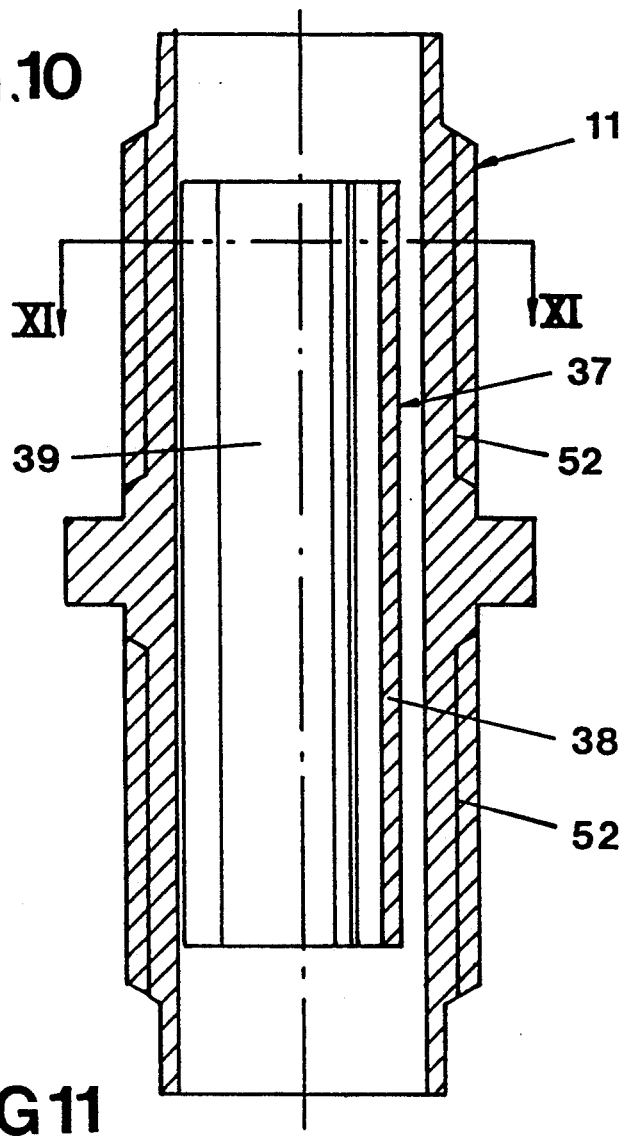
FIG. 10 shows a section through a receiving means with integrated centering means.
Figure 11:
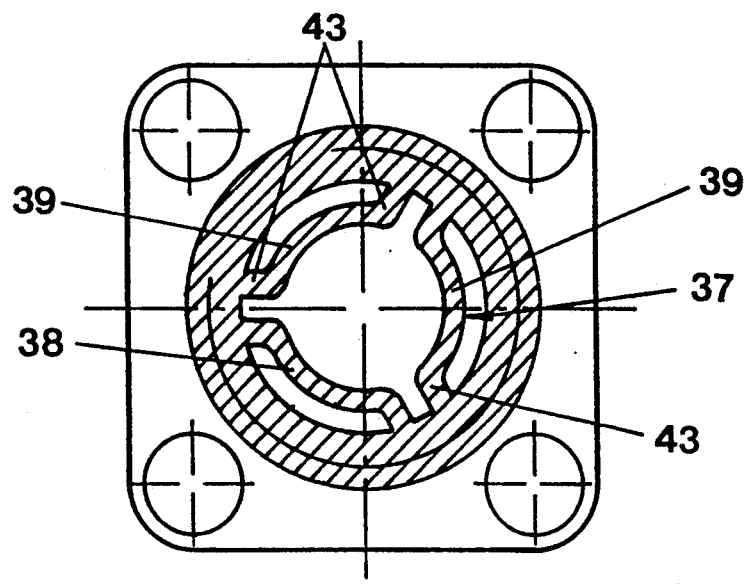
FIG. 11 is a section along the line XI—XI in FIG. 10.

The embodiment according to FIG. 10 and 11 differs from the embodiments described above by the receiving means 11 and the centering means 37 being produced in one piece in a resilient material, e.g. through extrusion. The external guiding elements of the sleeve 38 are firmly connected with in section circular internal cylindric envelope surface of the receiving means. The sleeve 38 consists of three or another odd number of centering shanks 39, which are connected to said envelope surface by radial flanges 43.

Figure 12:
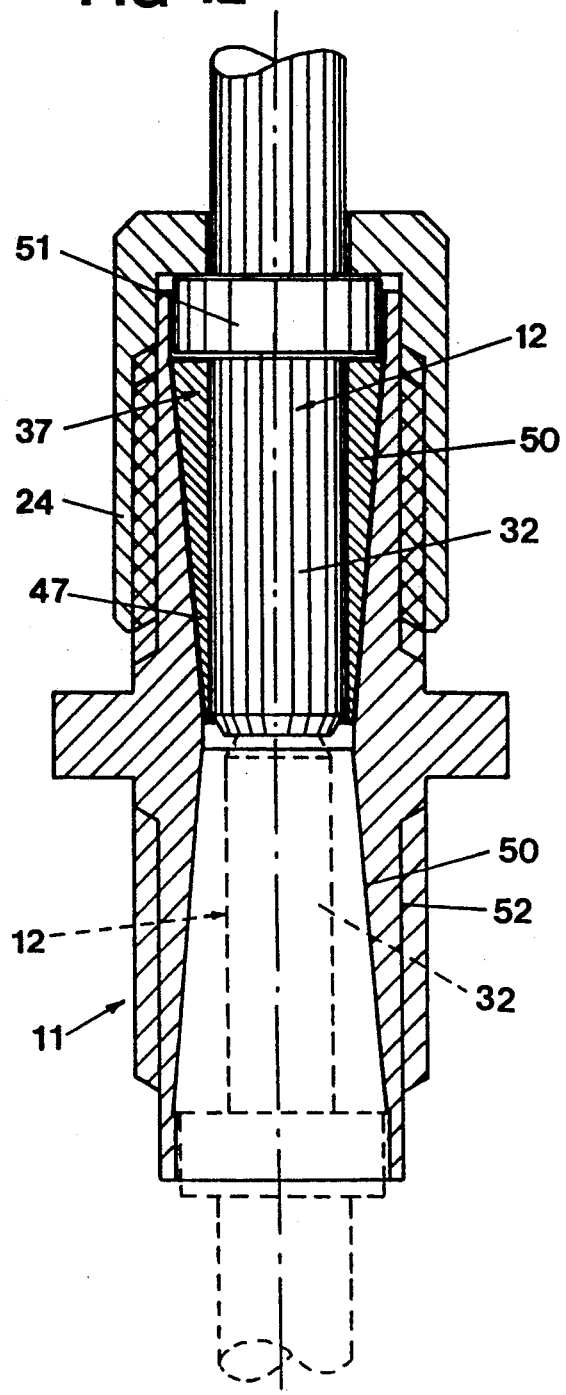
FIG. 12 shows a section through a modified connection device according to the invention.
Figure 14:
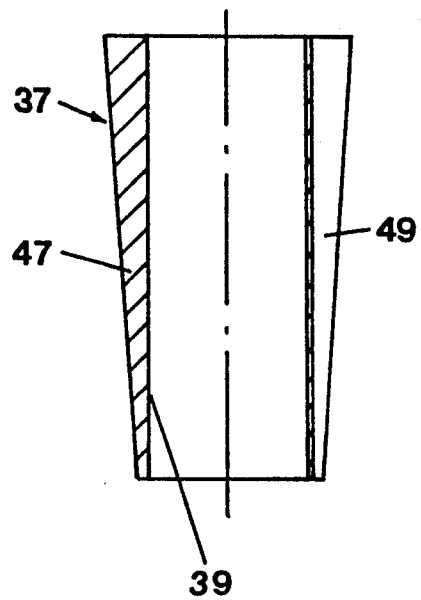
FIG. 14 is a section along the line XIV—XIV in FIG. 13.
Figure 13:
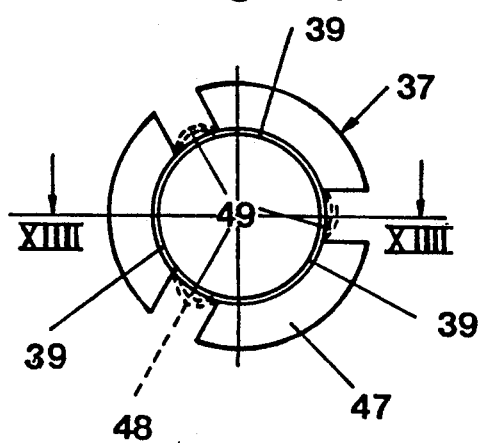
FIG. 13 shows a view from above of a centering means contained in the connection device according to FIG. 12.

A further variant of the connection device according to the invention is shown in the FIGS. 12-14. The centering means 37 in this embodiment is constituted by a conical sleeve 47, formed with resilient sectors 48, consisting of material weakened axial portions 49. In this example the internal wall surface of the sleeve constitutes the inner guiding element 39 of the centering means 37, while the outer guiding element 40 is constituted by those parts of the outer envelope surface, which are situated between the resilient sectors. The receiving means 11 is provided with conical seats 50 corresponding to the conicity of the centering means 37. The conical sleeve 47 on the inside is formed after the external form of the connection pin 32, which in the embodiment shown in FIG. 12 has cylindric form. The connection pin 32 of the insertion means 12 is provided with a circumferential flange 51, which forms a shoulder against one of the end surfaces of the conical sleeve 47. By means of a sleeve nut 24 the sleeve 47 is pressed into the conical seats 50 of the receiving means, whereby the sleeve along its total length forms around the connection pin 32 of the insertion means and centers this to the center of the sleeve. When the sleeve is pushed into the conical seat the thin portions 49 bulge outwards, which is shown with dash dotted lines in FIG. 13, and the internal limitation thus can adapt to the diameter of the insertion means. The tolerance of the insertion means is normally not more than 2-3 $\mu$m, why a relatively small deformation of the sleeve occurs. The length of the insertion means is ground in relation to the cone of the sleeve with an accuracy of e.g. 3 μm. At certain tightening moment of the sleeve nut 24, the fiber end will come into an axially accurate position, as is evident from FIG. 12 there is a possibility in this way to center insertion means with different diameters. The centering means is adapted to the different diameters, but the same receiving means can be used. This means that in the market available different systems with different diameters of insertion means may be connected.

TABLE OF REFERENCE DESIGNATIONS 11 receiving means
12 insertion means
13 plug
14 plug front end portion
15 Y-formed channel
16 central bore with small diameter
17 central bore with larger diameter
18 plug rear end portion
19 bore with substantially larger diameter
20 radial slot
21 the conical bottom of the slot
22 radially projecting means e.g. a lip
23 shoulder
24 cap nut
25 fibre cable
26 stress-relieving membrane
27 clamping sleeve
28 secondary protection
29 primary protection
30 optical fibre
31
32 connection pin
33 rods
34 channel
35 smoothed down portion
36 lip
37 centering means
38 sleeve
39 inner guiding elements, e.g. centering shanks
40 outer guiding elements, e.g. azial edge foldings
41 bent edge
42 slots
43 radial flanges
44 front end portion
45 corresponding recess
46 bow formed portion
47 conical sleeve
48 resilient sectors
49 material weakened portion
50 conical seats
51 circumferential flange
52 external threads at the receiving means 11
53 internal threads at the sleeve nut 24
54 flange

I claim:

1. Connection device for connecting the end portions of axially opposite to each othe situated optical fibres (30) and comprising insertion (12) and receiving means (11) designed for cooperation with at least a centering means (37), in form of a conical sleeve (47) provided with guiding elements (39) extending in the longitudinal direction of the sleeve cooperating with conical seats (50) of the receiving means (11) for radial and axial centering of the end portions of the optical fibres relatively each other, characterized therein, that the insertion means (12) comprises at least three cylindrical rods (33), which between themselves form a central channel (34) for receiving of the optical fibres (30), and which rods with their internal end portion are fixed in the retainer (13) of the insertion means (12) and with their external end portion are situated outside this forming its connection pin (32), designed for cooperation with the centering means (37), and that the attachment end is provided to be bent radially outward and fixed in these positions during simultaneous compression of the rods in a direction towards the center axis of the insertion means (12), and that the conical sleeve (47) is closed in cross section by the resilient sectors (48) which consist of material weakened axial portions (49) along the entire length of the sleeve, which sectors are elastically deformable and/or in section curved, folded or in an other way elastically compliant.

2. Connection device according to patent claim 1, characterized therein, that the attachment end of the rods (33) is formed with at least one radially projecting means (36) for cooperation with corresponding means (22) at the insertion means (12) for axial locking of the rods (33).

3. Connection device according to patent claim 1, characterized therein,
   that the rods are formed as cantilevers, one arm of which is constituted by the attachment end of rod, which is provided with a smoothed down portion (35), which is arranged to cooperate with a conical guiding surface (21) in the insertion means (12), and
   that the guiding surfaces (12) are designed to press said attachment ends radially outwards, so that the external end portions formed by the connection pins of the insertion means are pressed radially into contact with each other.

4. Connection device according to patent claim 1, characterized therein
   that the resilient sectors of the centering means (37) are constituted by axial edge foldings (40), ridges or the like, that each edge folding (40) contains resilient centering shanks the bent edge (41) of which is formed to constitute one of the external guiding surfaces of the centering means, and
   that the portions between the edge foldings are formed to constitute the internal guiding and centering surfaces (39) of the centering means (37).

5. Connection device according to patent claim 1, characterized therein,
   that the centering means (37) is constituted by a conical sleeve (47), the resilient sectors (48) of which consist of material weakened axial portions (49), which are elastically deformable and/or in section curved, folded or in an other way elastically compliant.

6. Connection device according to patent claim 1, characterized therein,
   that the centering means (37) is constituted by a sleeve (38) on the inside provided with axially oriented centering surfaces (39) corresponding to the number of rods (33), which surfaces each shom a bow formed portion (46) connected to the inside of the sleeve by means of radial flanges (43).

7. Connection device according to patent claim 5, characterized therein,
   that the receiving means (11) is formed with double sided receiving points for two coaxially connectable insertion means (12) from each side, and,
   that each receiving point is shaped with a conicity corresponding to the conicity of the centering sleeve (37).

8. A device for connecting the end portions of optical fibres (30) comprising:
insertion means (12) for receiving the end of an optical fibre,
tubular receiving means (11) having a central opening extending therethrough, said opening having conical seats (50) at each end thereof, said conical seats being in axial alignment with each other and opening outward from said receiving means (11),
a conical sleeve (37) having an inner passage extending therethrough and an outer conical surface dimensioned to conform to and to mate with said conical seats (50), said sleeve (37), including a plurality of resilient, flexible sectors (48) which extend longitudinally along the entire length of said sleeve (37), said sectors (48) being elastically deformable and/or in section curved, folded or otherwise elastically compliant, and said inner passage dimensioned to receive said insertion means, and
means for securing (24) said conical sleeve (37) within said opening in said receiving means (11) wherein said outer conical surface of said conical surface of said conical sleeve (37) is forced into engagement with said conical seat (50).

* * * * *